(12) United States Patent
Choi

(10) Patent No.: US 10,587,335 B1
(45) Date of Patent: Mar. 10, 2020

(54) DIRECT-TO-USER EARTH OBSERVATION SATELLITE SYSTEM

(71) Applicant: Thomas Kyo Choi, Los Angeles, CA (US)

(72) Inventor: Thomas Kyo Choi, Los Angeles, CA (US)

( * ) Notice: Subject to any disclaimer, the term of this patent is extended or adjusted under 35 U.S.C. 154(b) by 0 days.

(21) Appl. No.: 16/525,680

(22) Filed: Jul. 30, 2019

(51) Int. Cl.
*H04B 7/185* (2006.01)
*H04W 76/18* (2018.01)
*H04W 84/06* (2009.01)

(52) U.S. Cl.
CPC ..... *H04B 7/18593* (2013.01); *H04B 7/18521* (2013.01); *H04B 7/18528* (2013.01); *H04W 76/18* (2018.02); *H04W 84/06* (2013.01)

(58) Field of Classification Search
CPC .......... H04B 7/18593; H04B 7/18528; H04W 76/18; H04W 84/06
USPC ........................................................ 455/411
See application file for complete search history.

(56) References Cited

U.S. PATENT DOCUMENTS

| | | | | |
|---|---|---|---|---|
| 6,241,192 B1* | 6/2001 | Kondo | ................... | B64G 1/244 244/158.4 |
| 7,151,929 B1* | 12/2006 | Jenkin | ................ | H04B 7/18582 455/430 |
| 9,960,837 B1* | 5/2018 | Coleman | ............ | H04B 7/18521 |
| 2018/0167586 A1* | 6/2018 | Rutschman | .......... | G06K 9/0063 |

FOREIGN PATENT DOCUMENTS

| | | |
|---|---|---|
| WO | 02/018874 A1 | 3/2002 |
| WO | WO 02/18874 A1 * | 3/2002 |
| WO | 03/040653 A1 | 5/2003 |
| WO | WO 03/040653 A1 * | 5/2003 |

* cited by examiner

*Primary Examiner* — William Nealon
(74) *Attorney, Agent, or Firm* — Spruson & Ferguson (Hong Kong) Limited

(57) ABSTRACT

Satellites in the direct-to-user Earth observation (EO) satellite system support inter-satellite communication and form a multihop communication network. Each satellite has a radio transceiver with a phased array antenna for directly communicating with a user radio station that issues an EO request of a user. Physical servers are distributed over the satellites and networked to form an in-space computer network that is Internet-enabled. The multihop communication network enables the servers to be mutually communicable. Raw data generated from the EO sensors are processed by the servers to yield desired EO data that meets the user's requirement. Advantageously, the servers set up a user authentication server configured to verify the user identity for determining acceptance or denial of the EO request, and an application server for interacting with the user. Hence, the EO request is entirely handled in Space without involving a terrestrial non-user facility for user authentication and raw-data processing.

16 Claims, 3 Drawing Sheets

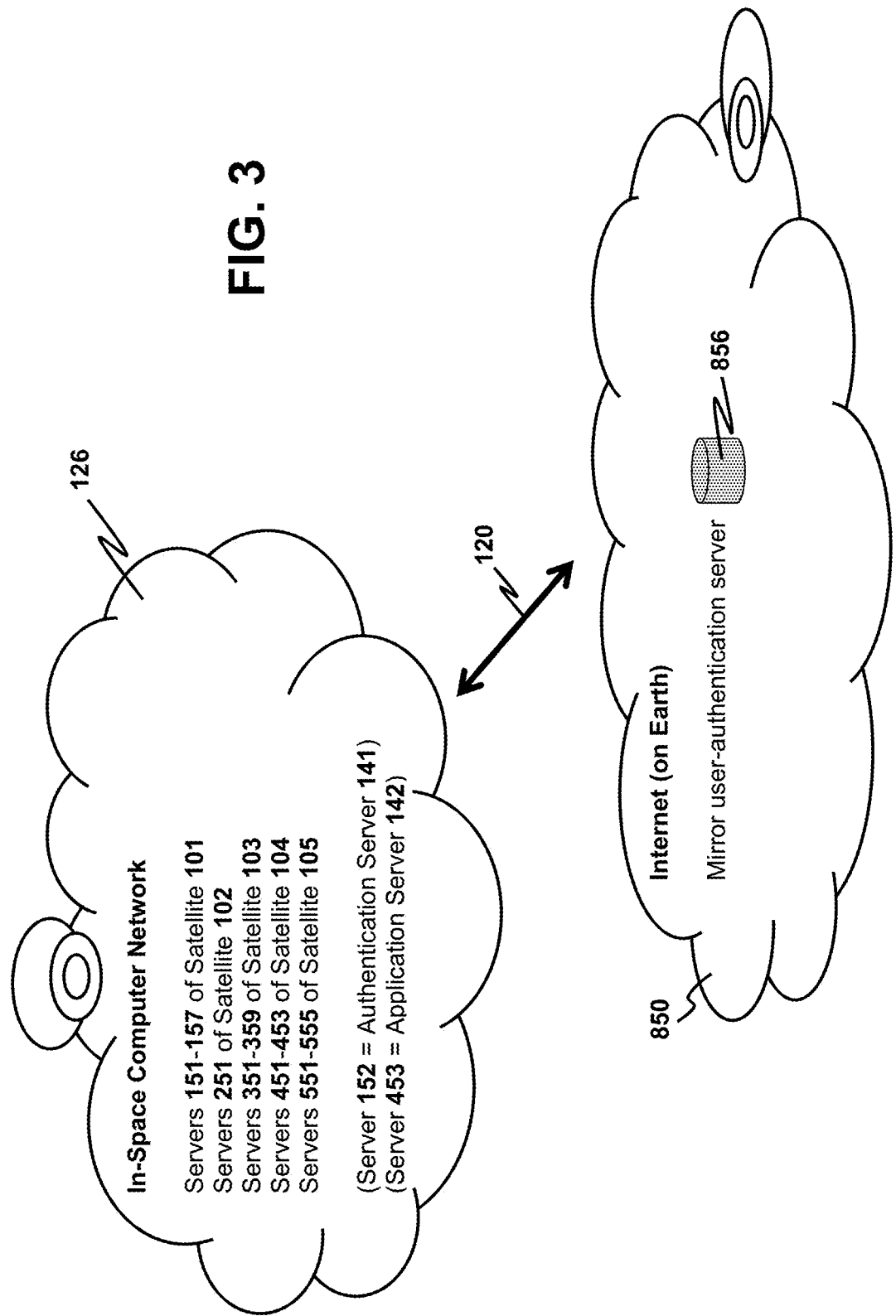

DIRECT-TO-USER EARTH OBSERVATION SATELLITE SYSTEM

LIST OF ABBREVIATIONS

EO Earth observation
IP Internet Protocol
IR Infrared
LEO Low earth orbit
RF Radio frequency
TCP Transmission Control Protocol
URS User radio station

FIELD OF THE INVENTION

The present invention relates to a satellite system having a plurality of satellites for performing EO and enabling direct communication with a URS to receive an EO request and to deliver EO data.

BACKGROUND

In a typical EO satellite system, such as Landsat and satellite systems disclosed in WO02/018874 and WO03/040653, a terrestrial station having a computing server therein is required to receive raw EO images from one or more EO satellites, and then process the raw EO images to yield desired EO data that meet an end user's requirement. An individual EO satellite is communicable with the terrestrial station only if the individual EO satellite moves to a position in Space visible to the terrestrial station. Furthermore, the raw EO images can be processed on-ground only thereafter. It adds to delay for the end user to receive the desired EO data. In addition, a terrestrial communication network, such as a private leased line or the Internet, is involved in transmitting the desired EO data to the end user. It adds to a risk of security breaches during data transmission.

US2018/0167586 discloses a satellite system having one or more satellites for imaging the Earth with raw EO images processed by computing processors on-board the one or more satellites to give desired EO data that meet requirements of an end user. Although the delay for obtaining the desired EO data by the end user is expected to be shortened, the desired EO data are required to be sent to a terrestrial station first and then delivered to the end user. The risk of security breaches is still present. Furthermore, failure of the terrestrial station due to any disaster, such as power failure, blocks the end user from obtaining the desired EO data unless a redundant terrestrial station as a back-up is available.

Note that the terrestrial station is not necessarily a trusted entity or a secure entity from the perspective of the end user who makes the EO request. The terrestrial station can be regarded to be a terrestrial non-user facility. Although eliminating any support from terrestrial stations to EO satellites is not possible, it is desirable if an EO satellite system is self-sufficient to process the EO request from the end user entirely in Space and deliver desired EO data directly to the end user without involving any terrestrial non-user facility. There is a need in the art for such EO satellite system.

SUMMARY OF THE INVENTION

An aspect of the present invention is provide an EO satellite system self-sufficient to handle an EO request of a user so as to generate desired EO data that meet the user's requirement without involving a terrestrial non-user facility during handling the EO request.

The system comprises a plurality of satellites. The plurality of satellites is configured and arranged to form a multihop communication network. An individual satellite comprises a first radio transceiver for providing satellite-to-ground bidirectional communication. Hence, a URS that issues the user's EO request and provides a requirement on target EO data is communicable with the system through a visible satellite in the plurality of satellites, where the visible satellite is visible to the URS. The system further comprises one or more EO sensors distributed over one or more EO satellites selected from the plurality of satellites for sensing the Earth. Additionally, the system further includes a plurality of physical servers distributed over the plurality of satellites. Different physical servers in the plurality of physical servers are networked together to form an in-space computer network, and are mutually communicable via the multihop communication network. The plurality of physical servers is arranged to receive and process raw data generated from the one or more EO sensors to yield desired EO data that meet the target EO data requirement. Advantageously, the plurality of physical servers is further arranged to set up a user authentication server configured to verify an identity of the user for user authentication so as to determine acceptance or denial of the EO request. As a result, the EO request is entirely handled by the system in Space without a need to involve a terrestrial non-user facility for user authentication and raw-data processing.

Preferably, the plurality of physical servers is further arranged to set up an application server. The application server is at least configured to provide a user interface for interacting with the user via the URS, and to interact with the authentication server in user authentication. Preferably, the application server is further configured to configure the one or more EO sensors to sense the Earth in response to the EO request after acceptance thereof, to request the plurality of physical servers to allocate computation resources for processing the raw data, to configure the allocated computation resources to process the raw data for meeting the target EO data requirement in the desired EO data, and to configure the visible satellite to send the desired EO data to the URS.

It is also preferable that the plurality of physical servers is implemented with the Internet protocol suite for forming the in-space computer network. As one advantage, it enables the URS to access the application server based on the TCP/IP protocol.

In certain embodiments, the plurality of physical servers is configured to be a computing cloud. As a result, the user authentication server and the application server are realized as distributed servers.

Optionally, each satellite in the plurality of satellites is an individual EO satellite. It allows the system to real-time image an area on Earth that the user intends to observe, and enables the user to real-time or near real-time receive the desired EO data. It also allows the system to immediately image an area on which the user presently locates when the user instructs the system to do so through the EO request.

In certain embodiments, the individual satellite further comprises one or more inter-satellite communication modules for providing direct satellite-to-satellite bidirectional communication in forming the multihop communication network. The one or more inter-satellite communication modules may include a laser communication transceiver for enabling laser communication in Space. The one or more inter-satellite communication modules may also include a second radio transceiver for enabling millimeter wave communication in the V band.

In certain embodiments, the one or more EO sensors include an imaging sensor for imaging the Earth. The imaging sensor may be configured to be responsive to infrared or visible light in imaging the Earth.

In certain embodiments, the one or more EO sensors include a laser scanner for performing laser remote sensing.

In certain embodiments, the one or more EO sensors include a microwave sensor for performing microwave remote sensing.

In certain embodiments, the first radio transceiver includes a phased array antenna for performing adaptive beamforming in the satellite-to-ground bidirectional communication.

In certain embodiments, the first radio transceiver is configured to transmit and receive signals in the L band or the S band, or both.

In certain embodiments, the individual satellite may further comprise one or more third radio transceivers for further providing the satellite-to-ground bidirectional communication, where the first radio transceiver and an individual third radio transceiver are configured to operate on different radio frequency bands in providing the satellite-to-ground bidirectional communication.

In certain embodiments, the individual satellite further comprises one or more laser-based optical communication modules for further providing the satellite-to-ground bidirectional communication.

Other aspects of the present invention are disclosed as illustrated by the embodiments hereinafter.

BRIEF DESCRIPTION OF THE DRAWINGS

FIG. 3 illustrates an in-space computer network connectable to the Internet on the Earth, where the in-space computer network is formed by physical servers distributed over the satellites of the EO satellite system of FIG. 1.

Figure 1:
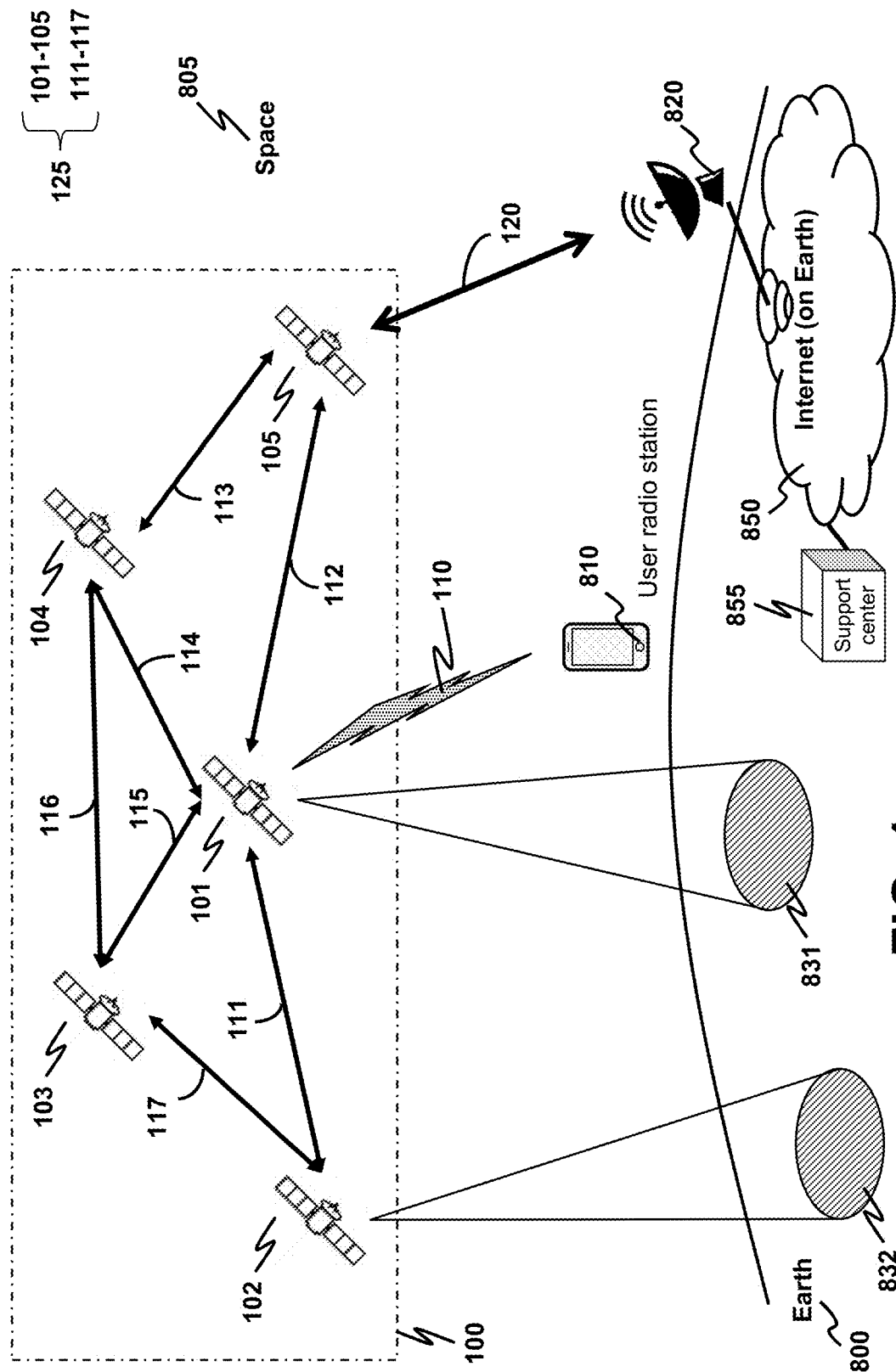
FIG. 1 depicts, in accordance with an exemplary embodiment of the present invention, an EO satellite system for performing EO with a feature of directly communicating with a user that makes an EO request, where the EO satellite system is occasionally supported by an on-ground support system.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The following definitions are used herein in the specification and the appended claims. "A user" means a person or a pre-programmed automatic machine (such as a computer, a smartphone, etc.) that issues an EO request. "A terrestrial non-user facility" means any facility on Earth not controlled or owned by the user. It follows that a trusted relationship between the user and the terrestrial non-user facility is not automatically established. A terrestrial non-user facility may be an Earth station, a computing server located on the Earth, a terrestrial communication network, etc., neither controlled nor owned by the user. "A cloud" or "a computing cloud" is interpreted in the sense of cloud computing or, synonymously, distributed computing over a network unless otherwise specified. "A server" is interpreted in the sense of computing. That is, a server is a computing server. A server is usually equipped with one or more processors for executing program instructions, and one or more storages for storing data. A server may be a standalone computing server (i.e. a physical server), a distributed server in the cloud, or a virtual server for handling clients' instructions. The one or more storages may be, for example, hard disks or solid-state disk drives. In case a physical server is installed on-board a satellite, the one or more processors and the one or more storages in the server are specifically configured to withstand solar and cosmic radiation, extremely high and low temperature, etc. so as to properly work in Space. "A mobile computing device" is a portable electronic device having computing power and configured to be used by a human user. For example, a mobile computing device may be a smartphone or a handheld tablet computer.

Disclosed herein is an EO satellite system self-sufficient to handle an EO request of a user so as to generate desired EO data that meet the user's requirement with an advantage of eliminating a need to involve a terrestrial non-user facility during handling the EO request. Avoiding the terrestrial non-user facility to be involved in handling the EO request confines the EO request to be handled entirely by the EO satellite system in Space. It increases security in various aspects such as reducing a likelihood of tampering and leakage of the generated EO data, reducing a likelihood of blocking the user from receiving the desired EO data, reducing a likelihood of revealing the identity of the user who has requested EO, etc. The Inventor has identified the following requirements for achieving the goal of handling the EO request entirely in Space. These requirements are addressed herein in developing the disclosed EO satellite system.

A direct-to-user link is required to communicate directly between the EO system and the user.

Processing of raw data obtained from EO sensors to yield the desired EO data is done in Space.

User authentication for verifying an identity of the user and hence determining whether or not to process the EO request is done in Space.

Also note that processing the raw EO data in Space shortens the delay for the user to obtain the desired EO data as mentioned above, offering an additional advantage to the disclosed EO satellite system.

Figure 2:
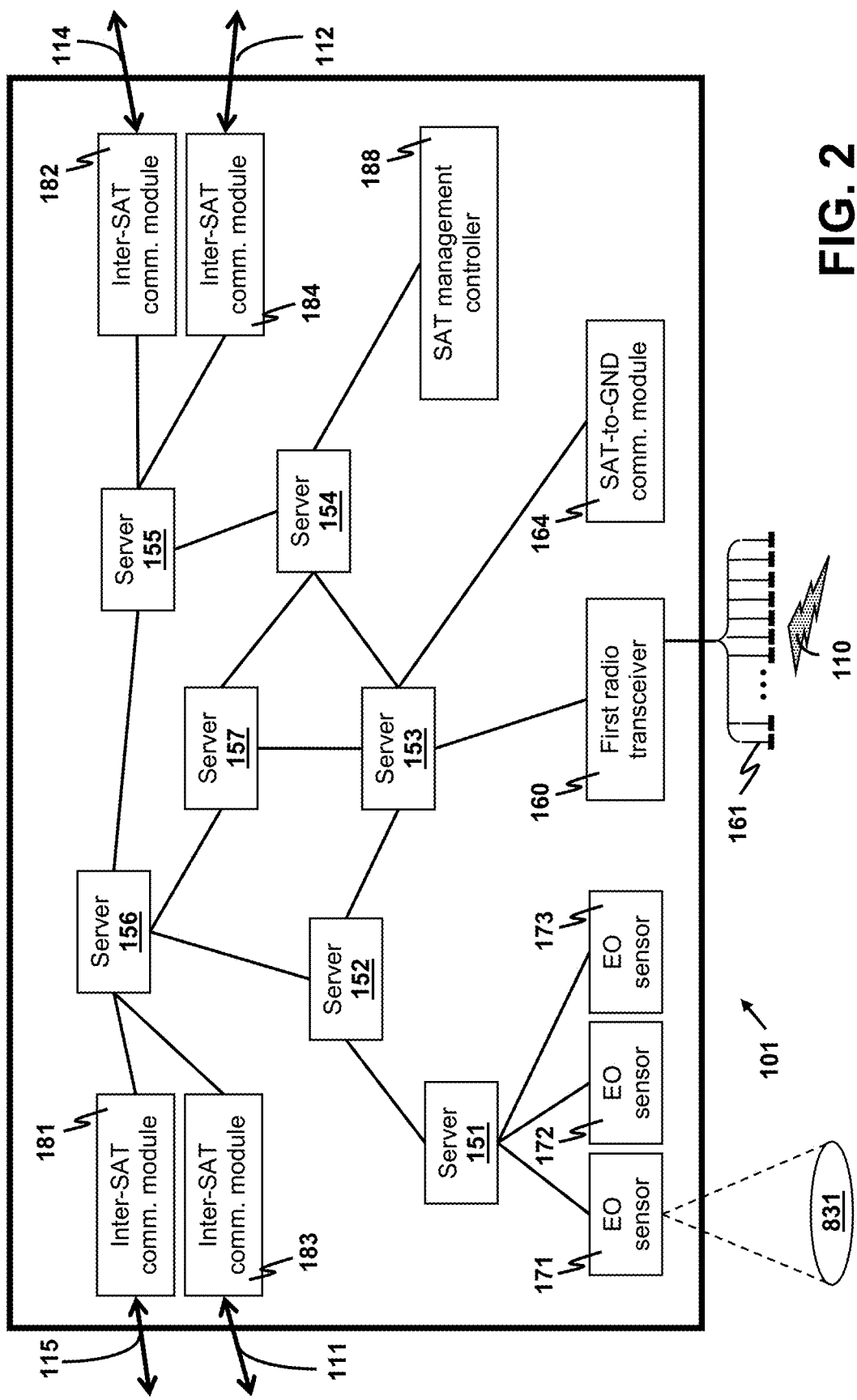
FIG. 2 depicts a schematic structure of an exemplary satellite in the EO satellite system depicted in FIG. 1.

The disclosed EO satellite system is exemplarily illustrated hereinafter with the aid of FIGS. 1-3. FIG. 1 depicts, in accordance with an exemplary embodiment of the present invention, an EO satellite system 100 in Space 805 for performing EO, where the EO satellite system 100 is directly and wirelessly communicable with a URS 810 that issues an EO request of a user. FIG. 2 depicts a schematic structure of an exemplary satellite in the EO satellite system 100. FIG. 3 illustrates an in-space computer network formed by networking computing servers of the EO satellite system 100 together, where the in-space computer network is connectable to the Internet 850 on Earth 800.

Refer to FIG. 1. The EO satellite system 100 is directly and wirelessly communicable with the URS 810, which issues the EO request of the user to the system 100. The user requests the system 100 to perform EO, and provides a requirement on target EO data such that the system 100 performs EO and yields desired EO data that meet the target EO data requirement.

The EO request includes information such as the region on Earth 800 to be imaged, the time to image the region, the spectral range of light to be included or filtered out in imaging the area, etc. The requirement on target EO data is usually attached to the EO request, although it is possible that the system 100 has stored a copy of the target EO data requirement already provided by the user. As an example for illustrating the target EO data requirement, consider a specific case that the user wishes to locate areas on fire in a residential area. The user requests the system 100 to image the residential area in IR and in visible spectrum. The target EO data required by the user is an image formed by highlighting the areas on fire on the image obtained in visible spectrum, where the areas on fire are identified from the IR image.

The URS 810 is a radio station used by the user for sending out the EO request and for receiving resultant EO data. For example, the URS 810 is owned by, or is under the control of, the user such that the user trusts the URS 810 to be secure in communicating with the system 100. Of particular advantage, the URS 810 may be a mobile computing device, offering mobility to the user and allowing the user to directly issue the EO request to the system 100 whenever a need to observe a certain part of the Earth 800 arises. Note that the mobile computing device is implemented with appropriate electronic circuits and RF components, such as RF transceivers and antennas, and programmed with appropriate communication protocols for initiating and communicating with the system 100.

The EO satellite system 100 comprises a plurality of satellites 101-105. Although FIG. 1 depicts that there are five satellites for illustrating the system 100, the present invention is not limited only to using five satellites in the system 100; the number of satellites in forming the disclosed EO satellite system in accordance with the present invention may be any number greater than or equal to two.

Each of the satellites 101-105 comprises a first radio transceiver for providing satellite-to-ground bidirectional communication such that the URS is communicable, directly and wirelessly, with the system 100 through a visible satellite in the plurality of satellites. The visible satellite is visible to the URS 810. That is, the visible satellite has a line-of-sight path with the URS 810.

Refer to FIG. 2, which depicts a schematic structure of the satellite 101 as a representative satellite for exemplarily illustrating a configuration of satellites used in the system 100. In the satellite 101, a first radio transceiver 160 is used for providing the satellite-to-ground bidirectional communication so as to communicate with the URS 810. In general, the URS 810, which may be a hand-held mobile computing device, is power-limited. To increase the signal-to-noise ratio in signal transmission or reception, preferably the first radio transceiver 160 is configured to provide adaptive beamforming. It is preferable that the first radio transceiver 160 includes a phased array antenna 161 for performing adaptive beamforming in the satellite-to-ground bidirectional communication. In one implementation option, the first radio transceiver 160 is configured to transmit and receive signals in the L band or the S band, or both. The L band covers a range of frequencies in the radio spectrum from 1 GHz to 2 GHz. For the S band, it has a frequency range of 2 GHz to 4 GHz. Transmitting signals at carrier frequencies in the L band or the S band has a number of practical advantages in the satellite-to-ground bidirectional communication, such as achieving a low attenuation when the uplink and downlink signals of the link 110 propagate in the troposphere, and enabling a low-cost implementation of the first radio transceiver 160.

Refer to FIG. 1. The plurality of satellites 101-105 is configured to support inter-satellite communication such that one satellite is bidirectionally communicable with another satellite if the two satellites in Space 805 are separated by a distance that is within a communication range of each of the two satellites. Inter-satellite communication is supported by installing each of the satellites 101-105 with one or more inter-satellite communication modules. By utilizing inter-satellite communication, the plurality of satellites 101-105 is arranged to form a multihop communication network 125. The multihop communication network 125 is formed by judiciously positioning the satellites 101-105 in such a way that in the plurality of satellites 101-105, a first satellite is communicable with a second satellite directly, or indirectly via a route including at least one intermediate satellite in between. For example, the satellite 102 directly communicates with the satellite 101 via a link 111. In another example, the satellite 102 indirectly communicates with the satellite 105 via a first route created by the links 111 and 112, where the satellite 101 is an intermediate satellite for relaying messages between the satellites 102 and 105. Note that the satellites 101, 102 and 105 are judiciously positioned such that the satellite 101 is within both communication ranges of the satellites 102 and 105, and such that the satellites 102 and 105 are also within the communication range of the satellite 101. Also in this example, the satellite 102 may also select a second route created by the links 117, 116 and 113 to indirectly communicate with the satellite 105, where the satellites 103 and 104 are two intermediate satellites in between. As shown in FIG. 1, the multihop communication network 125 is formed by including the satellites 101-105 and the links 111-117.

For elaborating the one or more inter-satellite communication modules installed in each satellite, consider the satellite 101 depicted in FIG. 2. In the satellite 101, inter-satellite communication modules 181-184 are used for supporting the inter-satellite communication links 115, 114, 111, 112, respectively. Usually, high-speed inter-satellite communication is required. To achieve high-speed data transmission, preferably the inter-satellite communication modules 181-184 include a laser communication transceiver for enabling laser communication in Space 805. More preferably, each of the inter-satellite communication modules 181-184 is a laser communication transceiver. Alternative to laser communication, high-speed data transmission is achievable by using millimeter wave communication. The inter-satellite communication modules 181-184 may include a second radio transceiver for enabling millimeter wave communication in the V band. The V band is a band of frequencies in the microwave portion of the electromagnetic spectrum ranging from 40 to 75 GHz.

As mentioned above, each of the satellites 101-105 is installed with the first radio transceiver to provide satellite-to-ground bidirectional communication. In this way, the URS 810 is enabled to communicate with the system 100, or any of the satellites 101-105, through sending out a message to a visible satellite selected from the plurality of satellites 101-105 and then relaying the message by the visible satellite to other satellites in the system 100 via the multihop communication network 125. As an illustrative example shown in FIG. 1, the satellite 101 is visible to the URS 810.

The link 110 for satellite-to-ground bidirectional communication is established between the URS 810 and the visible satellite 101.

Advantageously but optionally, the satellites 101-105 are arranged to travel on orbits selected such that the URS 810 is visible to at least one of the satellites 101-105 any time. It follows that anytime when a need to observe the Earth 800 arises, the user is able to make the request to the system 100.

The system 100 is equipped with one or more EO sensors for sensing the Earth 800. In certain situations, it may not be economically feasible to install the same set of EO sensors on each of the satellites 101-105. One or more EO satellites for performing EO are selected from the plurality of satellites 101-105. The one or more EO sensors are distributed over the one or more EO satellites. Thus, each EO satellite has at least one EO sensor. In certain embodiments, each of the satellites 101-105 is an EO satellite installed with at least one EO sensor. For illustration, the satellite 101 as shown in FIG. 2 is configured as an EO satellite, and includes three EO sensors 171-173 where the EO sensor 171 is used for sensing an area 831 on Earth 800 (see also FIG. 1).

In most EO applications, most often the Earth 800 is imaged. In certain embodiments, the one or more EO sensors include an imaging sensor for imaging the Earth 800. The imaging sensor is responsive to light within a predetermined range of wavelengths in imaging the Earth 800. Usually, an optical filter having a passband over the predetermined range of wavelengths is used to filter an incoming image and the filtered image is imaged. For example, a green-color-filtered image is useful for detecting vegetation over an imaged area; a full-color image imaged in visible spectrum is useful for identifying buildings and vehicles over the imaged area during daytime; a near-IR image may be used to identify human activities at night; and an IR image over a wide range of wavelengths is useful to determine a temperature distribution over the imaged area, where in fire-fighting applications, the temperature distribution helps identifying hot spots or burning sites.

Some practical EO applications are related to remote sensing. The one or more EO sensors may include a laser scanner for performing laser remote sensing. Laser scanning is useful for, e.g., profiling an altitude distribution over a scanned area. The one or more EO sensors may also include a microwave sensor for performing microwave remote sensing. Microwave scanning is useful in some situations in that the penetration of microwaves into vegetation, soil and snow generally increases with wavelength.

As illustrated in FIG. 1, the satellites 101 and 102 are EO satellites for imaging or scanning a first area 831 and a second area 832 on Earth 800, respectively. The system 100 has an advantage in that although the EO request is issued from the URS 810 to the system 100 through the satellite 101, the EO request can be quickly forwarded to the satellite 102 to perform EO if the request is about scanning the second area 832. Hence, real-time response to the EO request is achieved by utilizing the multihop communication network 125.

For performing EO and directly communicating with the URS 810, each of the satellites 101-105 is preferably positioned in a LEO, which is generally considered to be an orbit having an altitude of less than 2000 km above the Earth 800. Furthermore, EO satellites (e.g., the satellites 101, 102) in the system 100 may be operated on sun-synchronous orbits for advantages such as allowing EO to be performed under the same solar radiation condition. See U.S. Pat. No. 6,241,192 for more details.

Optionally, the system 100 may be extended to include a sufficient number of satellites to achieve global coverage. Global coverage may be established in a first perspective that the URS 810 is always able to "see" at least one visible satellite present for communicating with the system 100 such that the user is communicable with the system 100 anytime anywhere. Global coverage may also be established in a second perspective that any part of the Earth 800 can be observed or sensed by at least one EO satellite of the system 100. That is, any part of the Earth 800 is visible to at least one EO satellite. Advantageously, the system 100 may be configured to achieve global coverage in both the first and second perspectives.

Advantageously, the system 100 further comprises a plurality of physical servers distributed over the plurality of satellites 101-105. All individual physical servers in the plurality of physical servers are networked together to form an in-space computer network 126 (see FIG. 3), and are mutually communicable via the multihop communication network 125. For illustration, physical servers 151-157 in the satellite 101 as shown in FIG. 2 are networked together to form a part of the in-space computer network 126. As an example for illustration, it is considered that: the satellite 102 has a single physical server 251; the satellite 103 has physical servers 351-359; the satellite 104 has physical servers 451-453; and the satellite 105 has physical servers 551-555. Consider the satellites 104, 105 for example. Each of the physical servers 451-453 in the satellite 104 is accessible to any of the physical servers 551-555 in the satellite 105 through the link 113 of the multihop communication network 125. As such, all the physical servers 151-157, 251, 351-359, 451-453, 551-555 in the plurality of satellites 101-105 are mutually accessible, enabling these physical servers to be networked together to form the in-space computer network 126.

As mentioned above, raw data generated from the one or more EO sensors are required to be processed in order to generate desired EO data that meet the target EO data requirement. In the system 100, the plurality of physical servers 151-157, 251, 351-359, 451-453 and 551-555 is arranged to receive and process the raw data to yield processed EO data that meet the target EO data requirement. Usually, a sufficient part of computation resources in the aforementioned plurality of physical servers is allocated to process the raw data.

Note that the user directly communicates with the system 100 through the URS 810. Different from conventional EO satellite systems that receive EO commands from trusted earth-bound control stations, the system 100 is not initially aware of whether the user is eligible or authorized to make use of resources of the system 100 for performing EO. Hence, upon receiving the EO request, the system 100 performs user authentication by verifying an identity of the user. The system 100 then determines whether to accept or deny the EO request. To avoid involving a terrestrial non-user facility in carrying out user authentication, advantageously the plurality of physical servers 151-157, 251, 351-359, 451-453, 551-555 is further arranged to set up a user authentication server 141 configured to verify an identity of the user for user authentication so as to determine acceptance or denial of the EO request. In one implementation option, the user authentication server 141 is set up by assigning a physical server selected from the plurality of physical servers 151-157, 251, 351-359, 451-453, 551-555. As an example shown in FIG. 3, the physical server 152 is assigned as the user authentication server 141. In another option, the user authentication server 141 is set up as a distributed server with computation resources shared from the plurality of physical servers 151-157, 251, 351-359, 451-453, 551-555.

Since the user directly communicates with the system 100, it is desirable for the system 100 to provide a user interface for interacting with the user. Preferably, the plurality of physical servers 151-157, 251, 351-359, 451-453, 551-555 is further arranged to set up an application server 142 at least configured to provide the user interface for interacting with the user via the URS 810. Most often, the application server 142 is also configured to interact with the authentication server 141 in user authentication. Similar to the implementation of the user authentication server 141, the application server 142 may be a physical server (for example, the physical server 453 as shown in FIG. 3) or a distributed server. Apart from providing the user interface, most often the application server 142 is further used to control or command different resources in the system 100, such as the one or more EO sensors, for handling the EO request. Preferably, the application server 142 is further configured: to configure the one or more EO sensors to sense the Earth 800 in response to the EO request after the EO request is accepted according to the user authentication result; to request the plurality of physical servers 151-157, 251, 351-359, 451-453, 551-555 to allocate computation resources for processing the raw data generated from the one or more EO sensors; to configure the allocated computation resources to process the raw data to generate the desired EO data such that the target EO data requirement in the desired EO data is met; and to configure the visible satellite (visible to the URS 810) to send the desired EO data to the URS 810. Those skilled in the art will appreciate that the application server 142 may be programmed with appropriate program codes to cause the application server 142 to perform the above-listed tasks when the program codes are executed.

In forming the in-space computer network 126, preferably the plurality of physical servers 151-157, 251, 351-359, 451-453, 551-555 is implemented with the Internet protocol suite, making the in-space computer network 126 Internet-enabled. Some of the physical servers 151-157, 251, 351-359, 451-453, 551-555 may be configured as routers or gateways according to the Internet protocol suite. It results in an advantage that the URS 810 is enabled to conveniently access the application server 142 based on the TCP/IP protocol. Since a commonly used protocol rather than an unfamiliar one is used in accessing the application server 142, it reduces engineering effort in adapting the software stack of the URS 810 to interact with the application server 142.

It is also advantageous if the plurality of physical servers 151-157, 251, 351-359, 451-453, 551-555 is configured to be a computing cloud such that computation resources in these physical servers may be shared in an optimal way according to tasks to be performed. Note that if the computing cloud is set up, the user authentication server 141 and the application server 142 are realized as distributed servers.

In practice, an individual satellite in the system 100 is installed with a satellite management controller for controlling all resources in this satellite. As illustrated in FIG. 2, a satellite management controller 188 is installed in the satellite 101. The satellite management controller 188 is usually realized as a computing server, and is therefore usually networked with the physical servers 151-157. As such, the satellite management controller 188 is usually joined to the in-space computer network 126.

The system 100 as disclosed above is self-sufficient in handling the EO request without involving a terrestrial non-user facility. As one practical advantage, the system 100 is still operating even in case of disasters happened on Earth 800. For example, terrestrial communication networks on which the user relies fail due to power failure, earthquake, or fire. The ability to perform EO and obtain desired EO data by using the system 100 is particularly valuable in case of disasters.

Nevertheless, it is not intended that the system 100 is completely isolated from the Earth 800 except communicating with the URS 801. Advantageously, the system 100 is supported by an earth-bound support center 855 for maintaining the system 100 such as monitoring health of the satellites 101-105 and adjusting their directions-of-travel if required. Messages from the support center 855 are transmitted to the system 100 through a bidirectional communication link 120, which connects, for instance, the satellite 105 and an Earth station 820 when the satellite 105 is visible to the Earth station 820. The Earth station 820 may in turn connect to the support center 855 through the Internet 850.

By using the bidirectional communication link 120, the in-space computer network 126 is joinable to the Internet 850 on Earth 800, as shown in FIG. 3.

As one task for system maintenance, the user authentication server 141 in the system 100 is required to be regularly updated by the support center 855. Preferably, the user authentication server 141 is synchronized with a mirror user-authentication server 856 installed on Earth 800. These two servers 141, 856 are communicated via the Internet 850 on Earth 800, the bidirectional communication link 120 and the in-space computer network 126.

To establish the bidirectional communication link 120, one or more of the satellites 101-105 are each installed with one or more satellite-to-ground communication modules for communicating between the Earth station 820 and a certain satellite visible to the Earth station 820. For exemplarily illustrating the one or more satellite-to-ground communication modules, refer to FIG. 2. The satellite 101 is installed with a satellite-to-ground communication module 164 for communicating with the Earth station 820 and in turn communicating with the earth-bound support center 855 through the Internet 850 installed on Earth 800. In certain situations, it is desirable to have a high-speed link between the Earth station 820 and the system 100. To achieve high-speed communication, a laser-based optical communication module may be used for realizing the satellite-to-ground communication module 164. It is also possible to use radio communication in achieving the high-speed link. The satellite-to-ground communication module 164 is then realized as a radio transceiver. Usually, the first radio transceiver 160 and the satellite-to-ground communication module 164 are configured to operate on different radio frequency bands.

The forgoing disclosure describes the advantages offered by the system 100. Utilizing such advantages enables the disclosed system 100 to provide certain real-time services to the user. If all the satellites 101-105 in the system 100 are EO satellites each capable of observing or imaging the Earth 800, the presence of the multihop communication network 125 and the physical servers 151-157, 251, 351-359, 451-453, 551-555 facilitates the system 100 to realize two practical applications that are of value to the user. In a first application, a region on Earth 800 that the user intends to observe can be real-time imaged and analyzed, provided that the system 100 has a coverage over the region. In a second application, the area on which the user presently locates can be immediately imaged and analyzed in response to the user's EO request. In both applications, the user is empowered to acquire an immediate knowledge on the region of interest, and is enabled to real-time or near real-time receive the desired EO data.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. An Earth observation (EO) satellite system comprising:
a plurality of satellites configured and arranged to form a multihop communication network, an individual satellite comprising a first radio transceiver for providing satellite-to-ground bidirectional communication such that a user radio station (URS) that issues an EO request of a user and provides a requirement on target EO data is communicable with the system through a visible satellite in the plurality of satellites, the visible satellite being visible to the URS;
one or more EO sensors distributed over one or more EO satellites selected from the plurality of satellites for sensing the Earth; and
a plurality of physical servers distributed over the plurality of satellites, all individual physical servers in the plurality of physical servers being networked together to form an in-space computer network and being mutually communicable via the multihop communication network, the plurality of physical servers being arranged to receive and process raw data generated from the one or more EO sensors to yield desired EO data that meet the target EO data requirement;
wherein the plurality of physical servers is further arranged to set up a user authentication server configured to verify an identity of the user for user authentication so as to determine acceptance or denial of the EO request, whereby the EO request is entirely handled by the system in Space without a need to involve a terrestrial non-user facility for user authentication and raw-data processing.

2. The system of claim 1, wherein the plurality of physical servers is further arranged to set up an application server at least configured to provide a user interface for interacting with the user via the URS, and to interact with the authentication server in user authentication.

3. The system of claim 2, wherein the application server is further configured to configure the one or more EO sensors to sense the Earth in response to the EO request after acceptance thereof, to request the plurality of physical servers to allocate computation resources for processing the raw data, to configure the allocated computation resources to process the raw data for meeting the target EO data requirement in the desired EO data, and to configure the visible satellite to send the desired EO data to the URS.

4. The system of claim 3, wherein the plurality of physical servers is configured to be a computing cloud such that the user authentication server and the application server are distributed servers.

5. The system of claim 1, wherein the plurality of physical servers is implemented with the Internet protocol suite for forming the in-space computer network.

6. The system of claim 1, wherein each satellite in the plurality of satellites is an individual EO satellite, allowing the system to real-time image an area on Earth that the user intends to observe and enabling the user to real-time or near real-time receive the desired EO data.

7. The system of claim 1, wherein the individual satellite further comprises one or more inter-satellite communication modules for providing direct satellite-to-satellite bidirectional communication in forming the multihop communication network, the one or more inter-satellite communication modules including a laser communication transceiver for enabling laser communication in Space.

8. The system of claim 1, wherein the individual satellite further comprises one or more inter-satellite communication modules for providing direct satellite-to-satellite bidirectional communication in forming the multihop communication network, the one or more inter-satellite communication modules including a second radio transceiver for enabling millimeter wave communication in the V band.

9. The system of claim 1, wherein the one or more EO sensors include an imaging sensor for imaging the Earth.

10. The system of claim 9, wherein the imaging sensor is responsive to infrared or visible light in imaging the Earth.

11. The system of claim 1, wherein the one or more EO sensors include a laser scanner for performing laser remote sensing.

12. The system of claim 1, wherein the one or more EO sensors include a microwave sensor for performing microwave remote sensing.

13. The system of claim 1, wherein the first radio transceiver includes a phased array antenna for performing adaptive beamforming in the satellite-to-ground bidirectional communication.

14. The system of claim 1, wherein the first radio transceiver is configured to transmit and receive signals in the L band or the S band, or both.

15. The system of claim 1, wherein the individual satellite further comprises one or more third radio transceivers for further providing the satellite-to-ground bidirectional communication, the first radio transceiver and an individual third radio transceiver being configured to operate on different radio frequency bands in providing the satellite-to-ground bidirectional communication.

16. The system of claim 1, wherein the individual satellite further comprises one or more laser-based optical communication modules for further providing the satellite-to-ground bidirectional communication.

* * * * *